(12) United States Patent
Lee

(10) Patent No.: US 6,577,767 B2
(45) Date of Patent: Jun. 10, 2003

(54) TRANSCODING USING BLOCK-BASED MOTION VECTORS

(75) Inventor: Jungwoo Lee, Monmouth Junction, NJ (US)

(73) Assignee: Sarnoff Corporation, Princeton, NJ (US)

(*) Notice: Subject to any disclaimer, the term of this patent is extended or adjusted under 35 U.S.C. 154(b) by 0 days.

(21) Appl. No.: 10/180,243

(22) Filed: Jun. 26, 2002

(65) Prior Publication Data

US 2002/0181794 A1 Dec. 5, 2002

Related U.S. Application Data

(62) Division of application No. 09/335,810, filed on Jun. 18, 1999, now abandoned.
(60) Provisional application No. 60/121,531, filed on Feb. 25, 1999.

(51) Int. Cl.$^7$ .............................. G06K 9/36; G06K 9/46
(52) U.S. Cl. ....................... 382/236; 382/233; 382/250; 382/166
(58) Field of Search ................................ 382/235, 233, 382/236, 248, 250, 251, 268, 269, 298, 299, 230, 166, 260

(56) References Cited

U.S. PATENT DOCUMENTS 5,832,120 A * 11/1998 Prabhakar et al. .......... 382/233

FOREIGN PATENT DOCUMENTS

| EP | 0 781 052 A2 | 6/1997 |
|----|--------------|--------|
| WO | 97/14252 | 4/1997 |

OTHER PUBLICATIONS

"Fast Algorithms for DCT–Domain Image Down–Sampling and for Inverse Motion Compensation," by Neri Merhav and Vasudev Bhaskaran, IEEE Transactions on Circuits and Systems for Video Technology, vol. 7, No. 3, Jun. 1997, 9 pgs.
XP–000870210, Kim et al., "Transcoding DV into MPEG–2 in the DCT Domain", IS&T/SPIE Conf., Jan. 1999, (pp. 1026–1032).
XP–000638525, Wu et al., "An Efficient JPEG to MPEG–1 Transcoding Algorithm", Jun. 1996, (pp. 447–457).
XP–000492740, Chang et al., "Manipulation and Compositing of MC–DCT Compressed Video", IEEE JOurnal on Selected Areas in Communications, NY,, Jan. 1995, (pp. 1–11).

* cited by examiner

*Primary Examiner*—Phuoc Tran
(74) *Attorney, Agent, or Firm*—William J. Burke

(57) ABSTRACT

An input encoded video bitstream conforming to a first DCT-based image compression standard (e.g., MJPEG or DV) is converted into an output encoded video bitstream conforming to a second DCT-based image compression standard (e.g., MPEG) without having to fully decode the first bitstream according to the first image compression standard and without having to fully encode according to the second image compression standard in order to generate the output bitstream. Rather, a partial video decoder of a transcoding system applies steps of the first image compression standard to the input bitstream to generate dequantized DCT coefficient data. A DCT data converter of the transcoding system then processes the dequantized DCT coefficient data in the DCT domain as necessary to enable a partial video encoder of the transcoding system to apply steps of the second image compression standard to the converted DCT coefficient data in order to generate the output bitstream. The processing performed in the DCT domain by the partial video encoder includes motion estimation at block boundaries.

22 Claims, 3 Drawing Sheets

TRANSCODING USING BLOCK-BASED MOTION VECTORS

CROSS-REFERENCE TO RELATED APPLICATIONS

This application is a divisional of U.S. application Ser. No. 09/335,810, filed on Jun. 18, 1999, abandoned, and claims the benefit of the filing date of U.S. provisional application No. 60/121,531, filed on Feb. 25, 1999.

BACKGROUND OF THE INVENTION

1. Field of the Invention

The present invention relates to image processing, and, in particular, to transcoding encoded image data between bitstreams conforming to two different image compression standards.

2. Description of the Related Art

A number of different image compression standards have been and will continue to be used to encode image data for more efficient storage and/or transmission of video content. The JPEG (Joint Photographic Experts Group) standard was originally designed for still images, but is also applied to sequences of images in which each image is encoded using only intra-frame encoding techniques (i.e., without reference to any other images in the sequence). Such encoded data is referred to as motion-JPEG or MJPEG encoded data. In MJPEG encoding, each image is transformed using a block-based discrete cosine transform (DCT). The resulting DCT coefficients are then quantized and run-length encoded to generate sets of run-length pairs. The run-length pairs are then encoded into an MJPEG bitstream using variable-length coding (VLC).

The DV (Digital Video) standard is a coding standard for digital video camcorders and digital VCRs. Like MJPEG, the DV standard relies primarily on DCT-based intra-frame encoding techniques to encode sequences of images. One major difference between the DV and MJPEG standards is that DV encoding supports two different modes for the DCT transform: a frame mode and a field mode. In the frame mode, also referred to as the 8×8 mode, 8×8 blocks of pixel data are encoded using an 8×8 DCT transform, similar to the processing in MJPEG encoding.

In the field mode, also referred to as the 2–4×8 mode, image data are encoded using a 4×4 DCT transform. In 2–4×8 mode, two different types of 4×8 blocks of DCT coefficient data are generated: even 4×8 DCT blocks and odd 4×8 DCT blocks. An even 4×8 DCT block $X_e$ corresponds to the DCT of the sum of pixel data from the top and bottom fields of a video frame, as represented in the following Equation (1):

$$X_e = C_4[x(2i, j) + x(2i+1, j)]C_8^t, \qquad (1)$$

where $C_4$ is a length-4 DCT transform matrix, $C_8^t$ is the transpose of a length-8 DCT transform matrix, $x(2i,j)$ is a 4×8 block of pixel data from the top field, and $x(2i+1,j)$ is the corresponding 4×8 block of pixel data from the bottom field. Similarly, the corresponding odd 4×8 DCT block $X_O$ corresponds to the DCT of the difference of the pixel data from the same top and bottom fields, as represented in the following Equation (2):

$$X_o = C_4[x(2i, j) - x(2i+1, j)]C_8^t. \qquad (2)$$

The even and odd sets of DCT coefficient data generated using Equations (1) and (2) are then quantized, run length encoded, and variable-length encoded.

The MPEG (Moving Picture Experts Group) standard was designed for sequences of images, in which each image is encoded using intra-frame encoding techniques and/or inter-frame encoding techniques (in which image data are encoded based on pixel differences between the current image and a reference image that is generated from one or more other images in the sequence). As in MJPEG and DV processing, in MPEG processing, a DCT transform is applied to blocks of image data to generate blocks of DCT coefficients that are then further processed (i.e., quantized, run-length encoded, and variable-length encoded) to generate the corresponding MPEG encoded bitstream.

Much encoded video content exists—and will continue to be generated—based on the MJPEG and DV standards. It would be advantageous to be able to make such MJPEG- and DV-based video content available to, for example, PC users having only MPEG image processors. This would enable someone with a DV-based camcorder and an MPEG-based PC to generate video content with the camcorder and then play and otherwise process that video content on the PC.

Transcoding refers to the process of converting an input encoded video bitstream that conforms to one image processing standard (e.g., MJPEG or DV) into an output encoded video bitstream that conforms to another image processing standard (e.g., MPEG). One brute-force approach to transcoding is to fully decode the input bitstream using a decoder conforming to the first image processing standard and then re-encode the resulting decoded sequence of images using an encoder conforming to the second image processing standard. In order to implement such brute-force transcoding in many real-time applications (i.e., where the transcoder is required to generate the output bitstream at the same frame rate at which it receives the input bitstream), the transcoders would need to be implemented using expensive hardware-based (e.g., MJPEG or DV) decoders and (e.g., MPEG) encoders.

SUMMARY OF THE INVENTION

The present invention is directed to techniques for transcoding input encoded video bitstreams conforming to a first DCT-based image compression standard (e.g., MJPEG or DV) into output encoded video bitstreams conforming to a second DCT-based image compression standard (e.g., MPEG). As opposed to brute-force transcoding techniques in which an input bitstream is fully decoded and then fully re-encoded to generate an output bitstream, under the present invention, the input bitstream is only partially decoded according to the first standard into the DCT domain (i.e., dequantized DCT coefficients), and then the re-encoding processing for the second standard starts with those dequantized DCT coefficients to generate the output bitstream. Because transcoders of the present invention only perform part of the full decoding and encoding processes, which do not include application of the computationally expensive inverse and forward DCT transforms, these transcoders can be implemented using PC-based software-only solutions and still meet the throughput requirements of many real-time applications. As such, the expense of requiring full decoders and encoders is avoided by the present invention.

According to one embodiment, the present invention is a method for converting an input encoded video bitstream conforming to a first DCT-based compression algorithm into an output encoded video bitstream conforming to a second DCT-based compression algorithm different from the first DCT-based compression algorithm, comprising the steps of (a) applying decoding steps conforming to the first compression algorithm to the input bitstream to generate dequantized DCT coefficient data in a DCT domain; (b) performing motion-compensated inter-frame differencing on the dequantized DCT coefficient data in the DCT domain based on motion vectors corresponding to block boundaries; and (c) applying encoding steps conforming to the second compression algorithm to the motion-compensated inter-frame DCT coefficient difference data to generate the output bitstream.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

There are three different aspects to transcoding: syntax conversion, image resizing, and bit-rate control. Syntax conversion refers to the rearranging of data in the input encoded video bitstream to ensure that the output encoded video bitstream conforms to the syntax of the corresponding image compression standard. Image resizing refers to the scaling up or down of the image size of the data in the input bitstream for the output bitstream. Image resizing may be implemented to achieve desired or perhaps required dimensions of images for the output bitstream. In addition, image resizing may be implemented in order to conform to bit-rate limitations in the output bitstream. For example, the DV standard can support bit rates as high as 25 Mbits per second, while the MPEG-2 standard is limited to 15 Mbits per second. In addition to using image resizing to affect bit rate, further processing may be required for bit-rate control. For example, if the output bitstream has tighter storage and/or transmission constraints than the input bitstream, the transcoding process may involve quantization at a greater level in the output bitstream than that used in the input bitstream in order to control the bit rate at a level well below the upper limit supported by image processing standard of the output bitstream (e.g., even less than 15 Mbits per second for MPEG-2).

Figure 1:
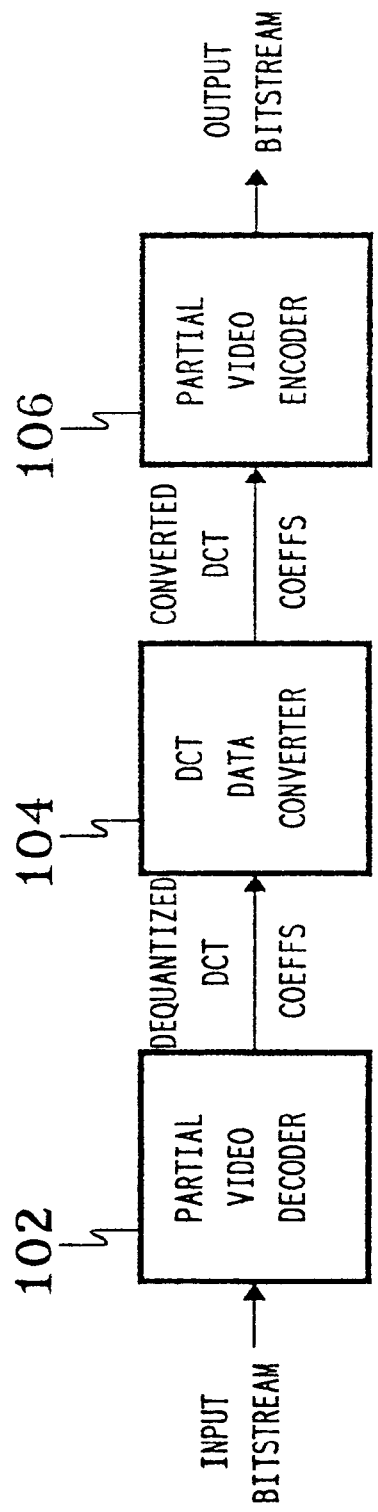
FIG. 1 shows a block diagram of a transcoding system, according to one embodiment of the present invention.

FIG. 1 shows a block diagram of a transcoding system 100, according to one embodiment of the present invention. Transcoding system 100 converts an input encoded video bitstream conforming to a first image compression standard (e.g., MJPEG or DV) into an output encoded video bitstream conforming to a second image compression standard (e.g., MPEG). Transcoding system 100 comprises a partial video decoder 102, a DCT data converter 104, and a partial video encoder 106. Depending on the particular implementation, the various components of transcoding system 100 can be implemented in software, hardware, or a combination of both.

In particular, partial video decoder 102 applies processing conforming to the first image processing standard (e.g., variable-length decoding, run-length decoding, and dequantization) to partially decode the input encoded video bitstream into dequantized DCT coefficient data. DCT data converter 104 converts the dequantized DCT coefficient data generated by partial video decoder 102 into corresponding converted DCT coefficient data for partial video encoder 106, which applies processing conforming to the second image compression standard (e.g., quantization, run-length encoding, and variable-length encoding) to the converted DCT coefficient data to generate the output encoded video bitstream.

The processing performed by partial video decoder 102 may comprise any suitable conventional processing techniques conforming to the first image processing standard in order to generate the decoded DCT coefficient data from the input encoded video bitstream. The processing performed by DCT data converter 104 in accordance with the present invention will depend on the particular video standards of the input and output encoded video bitstreams. Depending on the implementation, some or all of the processing of DCT data converter 104 may be optional. Depending on the implementation, the processing performed by partial video encoder 106 may comprise any suitable conventional processing techniques conforming to the second image processing standard or it may comprise special processing techniques in accordance with the present invention. The processing of DCT data converter 104 and those portions of the processing of partial video encoder 106 that are part of the present invention are described in the following sections.

DCT Data Conversion for MJPEG-to-MPEG Transcoding

This section describes the processing of DCT data converter 104 of transcoder 100 of FIG. 1, when the input encoded video bitstream is an MJPEG bitstream and the output encoded video bitstream is an MPEG bitstream, according to an embodiment of the present invention where the image size is reduced by a factor of 2 in both the horizontal and vertical dimensions. It will be understood that the image resizing of the present invention can be implemented for image resizing factors other than 2, including scaling up instead of scaling down, as well as scaling by two different factors in the horizontal and vertical dimensions.

The image resizing processing performed by DCT data converter 104 for MJPEG-to-MPEG transcoding can be represented by the matrix multiplication formula of Equation (3) as follows:

$$Y = TXT^t, \qquad (3)$$

where X is a 16×16 block of dequantized DCT coefficients formed by concatenating a 2×2 region of four 8×8 blocks of dequantized DCT coefficients generated by partial video decoder 102, T is an 8×16 transformation matrix, $T^t$ is the 16×8 transpose of T, and Y is the resulting 8×8 block of converted DCT coefficients.

The transformation matrix T can be represented by the matrix multiplication formula of Equation (4) as follows:

$$T = C_8 SA \qquad (4)$$

where $C_8$ is an 8×8 DCT transform, S is an 8×16 subsampling and anti-aliasing filter matrix, and the 16×16 matrix A can be represented by Equation (5) as follows:

$$A = \begin{bmatrix} C_8^t & O_8 \\ O_8 & C_8^t \end{bmatrix} \quad (5)$$

where $C_8^t$ is the transpose of $C_8$ and $O_8$ is an 8×8 zero submatrix.

The 8×16 subsampling and anti-aliasing filter matrix S can be presented by Equation (6) as follows:

$$S = \begin{bmatrix} w(0) \\ w(2) \\ \vdots \\ w(12) \\ w(14) \end{bmatrix} \quad (6)$$

where each w(i) is a 1×16 row of matrix S consisting of the anti-aliasing low-pass-filter kernel w shifted right by i pixels. Typical kernels are [1 0], [½ ½], and [¼ ½ ¼]. For example, when the kernel w is [½ ½], the 8 rows w(0) through w(14) of the matrix S are given be Equations (7)-(14) as follows:

$$w(0)=[½ ½ 0 0 0 0 0 0 0 0 0 0 0 0 0 0] \quad (7)$$
$$w(2)=[0 0 ½ ½ 0 0 0 0 0 0 0 0 0 0 0 0] \quad (8)$$
$$w(4)=[0 0 0 0 ½ ½ 0 0 0 0 0 0 0 0 0 0] \quad (9)$$
$$w(6)=[0 0 0 0 0 0 ½ ½ 0 0 0 0 0 0 0 0] \quad (10)$$
$$w(8)=[0 0 0 0 0 0 0 0 ½ ½ 0 0 0 0 0 0] \quad (11)$$
$$w(10)=[0 0 0 0 0 0 0 0 0 0 ½ ½ 0 0 0 0] \quad (12)$$
$$w(12)=[0 0 0 0 0 0 0 0 0 0 0 0 ½ ½ 0 0] \quad (13)$$
$$w(14)=[0 0 0 0 0 0 0 0 0 0 0 0 0 0 ½ ½] \quad (14)$$

Since T and $T^t$ are independent of the DCT coefficient data, they can be pre-computed to save computations during real-time processing.

Conversion of DCT coefficients by performing the matrix-based transformation of Equation (3) simultaneously achieves a number of different functions. In addition to resizing the DCT coefficient data (i.e., in this case, reducing both the horizontal and vertical dimensions by a factor of 2), the transformation of Equation (3) also simultaneously applies a spatial-domain anti-aliasing filter to the DCT coefficient data. This spatial-domain anti-aliasing filter reduces aliasing distortion that might otherwise result from downsampling, while providing computational savings by combining the subsampling processing and filtering processing into a single step.

The processing described in this section can also be applied in the context of DV-to-MPEG transcoding for encoded video data that was generated using the DV 8×8 mode.

DCT Data Conversion for DV-To-MPEG Transcoding

The following two sections describe the processing of DCT data converter 104 of transcoder 100 of FIG. 1, when the input encoded video bitstream is a DV bitstream and the output encoded video bitstream is an MPEG bitstream, according to one embodiment of the present invention.

4:1:1-to 4:2:0 Color Format Conversion for DV-To-MPEG Transcoding

One of the major differences between DV bitstreams and MPEG bitstreams is that the DV standard uses the YUV 4:1:1 color format, while the MPEG standard uses the YUV 4:2:0 color format.

Figure 3:
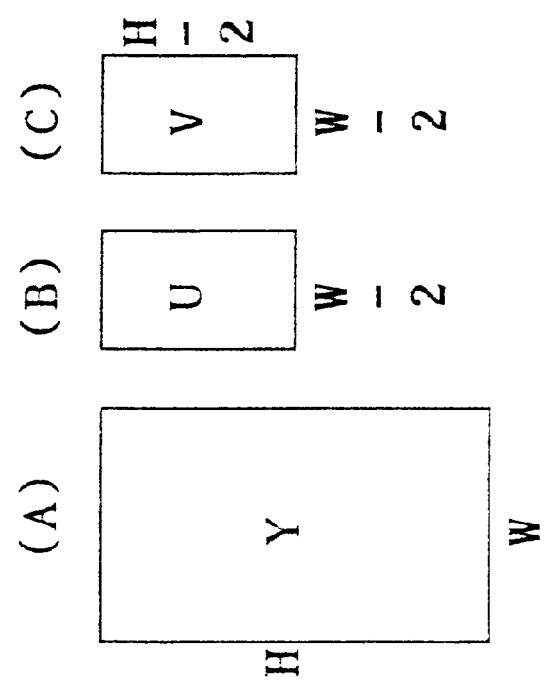
FIGS. 2A–C and 3A–C show the relative sizes for corresponding regions of pixel data for the YUV 4:1:1 and YUV 4:2:0 color formats.
Figure 2:
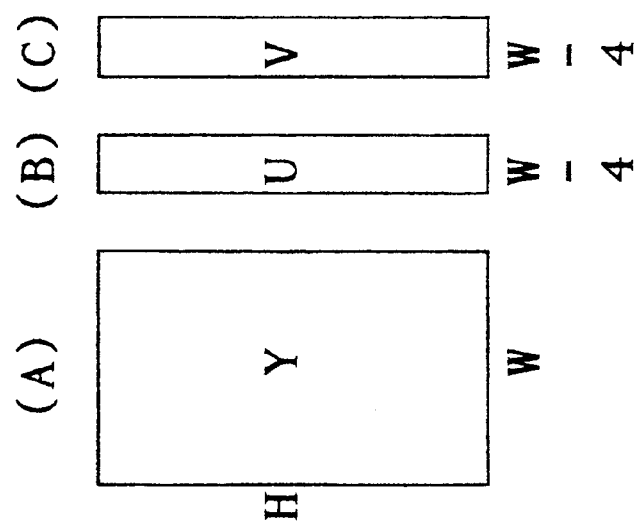

FIGS. 2A–C and 3A–C show the relative sizes for corresponding regions of pixel data for the YUV 4:1:1 and YUV 4:2:0 color formats. As shown in FIGS. 2A–C, for an H×W luma (Y) image, there are two H×W/4 chroma (U and V) images. As shown in FIGS. 3A–C, for an H×W luma image, there are two H/2×W/2 chroma images. In order for MPEG-compliant partial video encoder 106 of FIG. 1 to be able to generate an output bitstream conforming to the MPEG standard (which does not support the 4:1:1 color format), DCT data converter 104 is capable of converting dequantized DCT coefficient data generated by DV-compliant partial video decoder 102 from the YUV 4:1:1 color format into the YUV 4:2:0 color format, which can be handled by MPEG-compliant partial video encoder 106.

In particular, the DCT coefficients for the chroma data are converted according the matrix multiplication transformation of Equation (15) as follows:

$$Y=T_c X T_r, \quad (15)$$

where X is a 16×8 block of chroma (U or V) DCT coefficient data formed by vertically concatenating two 8×8 blocks of chroma DCT coefficient data generated by partial video decoder 102 of FIG. 1, $T_c$ is a 8×16 column-wise transformation matrix, $T_r$ is an 8×16 row-wise transformation matrix, and Y is the resulting 8×16 block of transformed chroma DCT coefficient data.

The column-wise transformation matrix $T_c$ is the same as transformation matrix T as represented by Equation (4). The row-wise transformation matrix $T_r$ can be represented by the matrix multiplication formula of Equation (16) as follows:

$$T_r = C_8 U A, \quad (16)$$

where $C_8$ is the 8×8 DCT transform, A is the same as the 16×16 matrix as represented by Equation (5), and the 8×16 matrix U can be represented by Equation (17) as follows:

$$U = \begin{bmatrix} 1 & 1 & 0 & 0 & 0 & 0 & 0 & 0 & 0 & 0 & 0 & 0 & 0 & 0 & 0 & 0 \\ 0 & 0 & 1 & 1 & 0 & 0 & 0 & 0 & 0 & 0 & 0 & 0 & 0 & 0 & 0 & 0 \\ 0 & 0 & 0 & 0 & 1 & 1 & 0 & 0 & 0 & 0 & 0 & 0 & 0 & 0 & 0 & 0 \\ 0 & 0 & 0 & 0 & 0 & 0 & 1 & 1 & 0 & 0 & 0 & 0 & 0 & 0 & 0 & 0 \\ 0 & 0 & 0 & 0 & 0 & 0 & 0 & 0 & 1 & 1 & 0 & 0 & 0 & 0 & 0 & 0 \\ 0 & 0 & 0 & 0 & 0 & 0 & 0 & 0 & 0 & 0 & 1 & 1 & 0 & 0 & 0 & 0 \\ 0 & 0 & 0 & 0 & 0 & 0 & 0 & 0 & 0 & 0 & 0 & 0 & 1 & 1 & 0 & 0 \\ 0 & 0 & 0 & 0 & 0 & 0 & 0 & 0 & 0 & 0 & 0 & 0 & 0 & 0 & 1 & 1 \end{bmatrix} \quad (17)$$

Since $T_c$ and $T_r$ are independent of the chroma DCT coefficient data, they can be pre-computed to save computations during real-time processing.

Conversion of chroma DCT coefficients by performing the matrix-based transformation of Equation (15) simultaneously achieves a number of functions. The transformation of Equation (15) halves the vertical dimension and doubles the horizontal dimension, thereby effectively converting each 16×8 block of chroma DCT coefficient data into an 8×16 block of chroma DCT coefficient data. In addition, the use of the filter matrix S in the column-wise transformation matrix $T_c$ provides one-dimensional spatial-domain anti-aliasing while subsampling the chroma DCT coefficient data in the vertical direction. As in the case of the resizing/filtering processing of Equation (3), this spatial-domain anti-aliasing filter reduces aliasing distortion that might otherwise result from downsampling, while providing computational savings by combining the subsampling processing and filtering processing into a single step.

The chroma conversion of chroma DCT coefficient data of Equation (15) can be applied in conjunction with the resizing/filtering processing of Equation (3). In that case, Equation (3) is applied to all of the DCT coefficient data (i.e., Y, U, and V data), while Equation (15 is applied to only the chroma DCT coefficient data.

2–4×8-To-8×8 Mode Conversion for DV-To-MPEG Transcoding

Another major difference between DV bitstreams and MPEG bitstreams is the possible existence of encoded video data in a DV bitstream that was encoded based on the DV 2–4×8 mode. In order for MPEG-compliant partial video encoder 106 of FIG. 1 to be able to generate an output bitstream conforming to the MPEG standard (which does not support the 2–4×8 mode), DCT data converter 104 is capable of converting dequantized DCT coefficient data generated by DV-compliant partial video decoder 102 from 2–4×8 mode to 8×8 mode, which can be handled by MPEG-compliant partial video encoder 106.

In particular, DCT data converter 104 the DCT coefficients for the chroma data are converted according the matrix multiplication transformation of Equation (18) as follows:

$$Y = T_1 X_e + T_2 X_o,  \qquad (18)$$

where $X_e$ and $X_o$ are corresponding 4×8 blocks of even and odd DCT coefficients as defined by Equations (1) and (2), respectively, and generated by partial video decoder 102 of FIG. 1. The 8×4 transformation matrices $T_1$ and $T_2$ can be represented by Equations (19) and (20) as follows:

$$T_1 = \tfrac{1}{2} C_8 (P_e + P_o) C_4^t \qquad (19)$$

and $$Y = \tfrac{1}{2} C_8 (P_e - P_o) C_4^t, \qquad (20)$$

where $C_8$ is an 8×8 DCT transform, $C_4^t$ is the transpose of a 4×4 DCT transform, $P_e$ is an 8×4 top-field interleaving matrix that can be defined by Equation (21) as follows:

$$P_e = \begin{bmatrix} 1 & 0 & 0 & 0 \\ 0 & 0 & 0 & 0 \\ 0 & 1 & 0 & 0 \\ 0 & 0 & 0 & 0 \\ 0 & 0 & 1 & 0 \\ 0 & 0 & 0 & 0 \\ 0 & 0 & 0 & 1 \\ 0 & 0 & 0 & 0 \end{bmatrix} \qquad (21)$$

and $P_o$ is an 8×4 bottom-field interleaving matrix that can be defined by Equation (22) as follows:

$$P_o = \begin{bmatrix} 0 & 0 & 0 & 0 \\ 1 & 0 & 0 & 0 \\ 0 & 0 & 0 & 0 \\ 0 & 1 & 0 & 0 \\ 0 & 0 & 0 & 0 \\ 0 & 0 & 1 & 0 \\ 0 & 0 & 0 & 0 \\ 0 & 0 & 0 & 1 \end{bmatrix} \qquad (22)$$

When implementing the matrix multiplication transformation of Equation (18), DCT data converter 104 of FIG. 1 converts each corresponding pair of even and odd 4×8 DCT blocks (i.e., $X_e$ and $X_o$) generated by partial video decoder 102 into a single 8×8 block of DCT coefficients (Y) for processing by partial video encoder 106.

Since $T_1$ and $T_2$ are independent of the DCT coefficient data, they can be pre-computed to save computations during real-time processing.

Re-Encoding of DCT Coefficient Data for MJPEG/DV-To-MPEG Transcoding

The following sections describe some of processing techniques performed by partial video encoder 106 of transcoder 100 of FIG. 1, when the input encoded video bitstream is either an MJPEG or DV bitstream and the output encoded video bitstream is an MPEG bitstream, according to one embodiment of the present invention. These processing techniques relate to requantization for rate-control, inter-frame encoding in the DCT domain, motion compensation in the DCT domain, inter/intra mode decision in the DCT domain, and field/frame mode decision in the DCT domain. As described below, all of these techniques involve manipulating the DCT coefficient data generated by partial video decoder 102 and/or DCT data converter 104 of FIG. 1.

Requantization for Rate Control

Depending on the particular application, there may be a need to reduce the number of bits used to represent the video content in the output encoded video bitstream, even after the resizing operations of DCT data converter 104 are implemented. One way to control the bit rate of the output bitstream is to adjust the quantization levels used during the requantization processing performed by partial video encoder 106. According to the MJPEG and DV standards, every block (or macroblock) in an MJPEG or DV file is encoded using the same quantization level. On the other hand, the MPEG standards allow the quantization level to vary from frame to frame and even from macroblock to macroblock within a frame. Thus, during MJPEG-to-MPEG transcoding, the possibility exists for partial video encoder 106 to vary quantization level on a macroblock basis from the MJPEG quantization level used by partial video decoder 102 in generating the dequantized DCT coefficients.

According to one embodiment of the present invention, the quantization levels used by partial video encoder 106 are determined using a non-linear profile rate-control algorithm. In particular, a requantized DCT coefficient y' may be represented by Equation (23) as follows:

$$y' = y * Qjpeg / (Qmpeg * 2) \qquad (23)$$

where y is the corresponding dequantized DCT coefficient generated by partial video decoder 102 and optionally converted by DCT data converter 104, Qjpeg is the quantization level at which the original MJPEG DCT coefficient data was quantized, and Qmpeg is the selected MPEG quantization level for the current macroblock, where Qmpeg may be represented by Equation (24) as follows:

$$Qmpeg = 31 * d / r \qquad (24)$$

where Qmpeg is rounded to the nearest integer (or alternatively truncated) and clipped to the range [1, 31], r is a reaction parameter that is typically set to twice the bit count of the original MJPEG (or DV) frame, and the discrepancy d in Equation (24) may be represented by Equation (25) as follows:

$$d = S - \alpha C \qquad (25)$$

where C is the cumulative bit count for the original MJPEG input bitstream and S is cumulative bit count for the resulting MPEG output bitstream, where both C and S are updated for each macroblock up to the current macroblock, and α is scale factor that can be set to a value other than 1 to either increase or decrease the target bit rate.

When too many bits are being used in the output bitstream, the value of d generated by Equation (25) will become large and positive, which will cause the value of Qmpeg generated by Equation (24) to become larger, which will cause the dequantized DCT coefficient y to be quantized at a lower level in Equation (23), thereby tending to reduce the rate at which bits will be added to the output bitstream. Analogously, when too few bits are being used in the output bitstream, d will become large and negative, causing Qmpeg to become smaller, causing y to be quantized at a higher level, thereby tending to increase the rate at which bits are added to the output bitstream.

Inter-Frame Encoding in the DCT Domain

As described in the Background section, the MPEG standard supports inter-frame encoding techniques in which image data are encoded based on pixel differences between the current image and a reference image that is generated from one or more other images in the sequence. Other than the DV 2–4×8 mode, neither the DV nor the MJPEG standard supports such inter-frame encoding. Conventional inter-frame encoding techniques involve the generation of inter-frame pixel differences followed by the application of a DCT transform to the inter-frame pixel difference data. However, since DCT transforms are linear operations, inter-frame differencing can be performed on the DCT coefficients after the application of the DCT transform.

According to certain embodiments of the present invention, partial video encoder 106 is capable of encoding the DCT coefficient data using inter-frame encoding techniques in which the inter-frame differencing is applied in the DCT domain. Depending on the particular implementation, the inter-frame differencing may be applied to the dequantized DCT coefficient data before requantization or to the requantized DCT coefficient data after requantization.

According to one embodiment, partial video encoder 106 is capable of performing inter-frame encoding in which all of the motion vectors are zero motion vectors. In this way, partial video encoder 106 is capable of generating an output encoded video bitstream having MPEG P and B frames (i.e., frames encoded using inter-frame encoding techniques) as well as I frames (i.e., frames encoded using only intra-frame encoding techniques).

Motion Compensation in the DCT Domain

In conventional inter-frame encoding techniques, motion compensation is performed on a pixel (or even sub-pixel) basis. Although such pixel-based motion compensation is possible in the DCT domain, it is computationally very expensive. In certain embodiments of the present invention, partial video encoder 106 is capable to performing non-zero motion compensation, where the motion vectors are limited to corresponding to block boundaries. In this so-called block-based motion compensation, the linearity of the relationship between inter-frame pixel differencing and the DCT transform is maintained and inter-frame differencing can be implemented in the DCT domain without expensive computations and without any loss of data. This block-based motion compensation will provide better encoding for those situations in which inter-frame encoding using a non-zero, block-based motion vector results in fewer bits in the output bitstream than either inter-frame encoding using a zero motion vector or intra-frame encoding for the same image data.

Inter/Intra Mode Decision in the DCT Domain

The MPEG standard allows individual macroblocks in P and B frames to be encoding using either inter-frame encoding or intra-frame encoding. In conventional MPEG algorithms, the inter/intra mode decision is made in the pixel domain. According to embodiments of the present invention, partial video encoder 106 makes the inter/intra mode decision in the DCT domain based on a macroblock-level variance measure Var, which may be represented by Equations (26) and (27) as follows:

$$\text{Var}_k = \frac{1}{128}\left[\sum_{i=0}^{63} c_i^2\right] - \left(\frac{1}{8}c_0\right)^2 \quad k = 1, 2, 3, 4 \tag{26}$$

$$\text{Var} = \sum_{k=1}^{4} \text{Var}_k \tag{27}$$

where $\text{Var}_k$ is the corresponding block-level variance measure, $c_i$ is $i^{th}$ DCT coefficient in an 8×8 block of DCT coefficients numbered in conventional zig-zag fashion from $i=0$ to $i=63$. For an "intra" variance, the DCT coefficients in Equation (26) are generated from the raw pixel data, while, for an "inter" variance, the DCT coefficients are generated from inter-frame pixel differences. Equation (26) is based on Parseval's theorem, which states that the sum of squares in the pixel domain is half of the sum of squares in the DCT domain, and the fact that $c_0$, the DC DCT coefficient, is eight times the mean of the pixels in the corresponding 8×8 block of pixels. If, for a given macroblock, the intra variance is less than the inter variance, then the macroblock is encoded using intra-encoding techniques (i.e., based on the raw pixel data); otherwise, the macroblock is encoded using inter-encoding techniques (i.e., based on the interframe pixel differences).

Field/Frame Mode Decision in the DCT Domain

Another mode decision supported by the MPEG standard is the field/frame mode decision in which it is determined whether to encode an image as a single frame or separated into the upper and lower fields of a single interleaved image. In conventional MPEG algorithms, the field/frame mode decision is made in the pixel domain. According to embodiments of the present invention, the field/frame mode decision is made in the DCT domain by comparing the variance for the frame DCT mode to the variance for the field DCT mode and selecting the mode having the smaller variance. For DV and MJPEG input bitstreams, the dequantized DCT coefficient data generated by partial video decoder 102 will already be structured in frame format. As such, the variance Vframe for the frame DCT mode can be computed directly from that dequantized DCT coefficient data using Equations (26) and (27).

According to embodiments of the present invention, the variance for the field DCT mode can be computed using equations similar to Equations (26) and (27), where each 16×16 macroblock X of DCT coefficient data in frame format has been converted to the corresponding 16×16 macroblock Y of DCT coefficient data in field format using the matrix multiplication transformation T of Equation (28) as follows:

$$Y=TX, \tag{28}$$

where the 16×16 transformation matrix T is given by Equation (29) as follows:

$$T=A^t DA, \tag{29}$$

where the 16×16 matrix A is given by Equation (5) and the 16×16 frame-to-field rearrangement matrix D is given by Equation (30) as follows:

$$D = \begin{bmatrix} 1 & 0 & & & & & & & & & & & & & & \\ & 1 & 0 & & & & & & & & & & & & & \\ & & 1 & 0 & & & & & & & 0 & & & & & \\ & & & 1 & 0 & & & & & & & & & & & \\ & & & & 1 & 0 & & & & & & & & & & \\ & 0 & & & & & 1 & 0 & & & & & & & & \\ & & & & & & & 1 & 0 & & & & & & & \\ & & & & & & & & 1 & 0 & & & & & & \\ 0 & 1 & & & & & & & & & & & & & & \\ & 0 & 1 & & & & & & & 0 & & & & & & \\ & & 0 & 1 & & & & & & & & & & & & \\ & & & 0 & 1 & & & & & & & & & & & \\ & & & & 0 & 1 & & & & & & & & & & \\ 0 & & & & & & & 0 & 1 & & & & & & & \\ & & & & & & & & 0 & 1 & & & & & & \\ & & & & & & & & & 0 & 1 & & & & & \end{bmatrix} \quad (30)$$

Summary of Transcoding Processing

Figure 4:
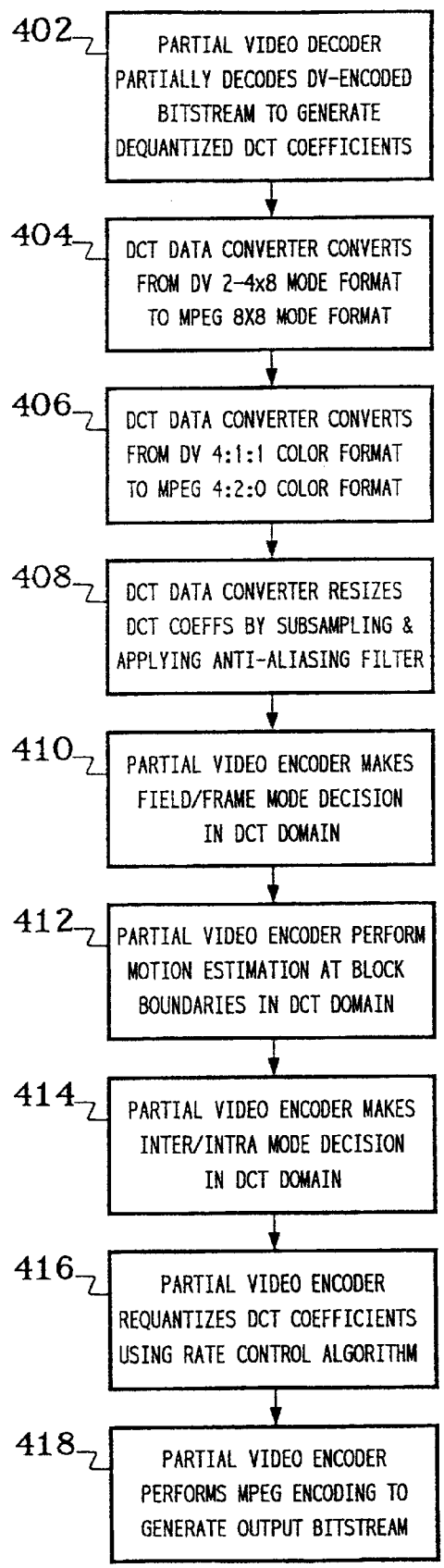
FIG. 4 shows a flow diagram of the DV-to-MPEG transcoding processing performed by transcoding system of FIG. 1, according to one embodiment of the present invention.

FIG. 4 shows a flow diagram of the DV-to-MPEG transcoding processing performed by transcoding system 100 of FIG. 1, according to one embodiment of the present invention. Transcoding processing begins with partial video decoder 102 of FIG. 1 partially decoding an input encoded video bitstream conforming to the DV standard to generate a set of dequantized DCT coefficients for each frame of DV-encoded data (step 402).

If the input bitstream was encoded in DV 2–4×8 mode, then DCT data converter 104 of FIG. 1 converts the dequantized DCT coefficient data from 2–4×8 mode format into the 8×8 mode format supported by the MPEG standard, according to Equation (18) (step 404). DCT data converter 104 also converts the DCT coefficient data from the YUV 4:1:1 color format into the YUV 4:2:0 color format supported by the MPEG standard, according to Equation (15) (step 406). In addition, DCT data converter 104 optionally resizes the DCT coefficient data by subsampling and applying the anti-aliasing filter, according to Equation (3) (step 408).

Following the processing of DCT data converter 104, partial video encoder 106 of FIG. 1 optionally performs the MPEG field/frame mode decision in the DCT domain, according to Equations (27) and (28) (step 410). Partial video encoder 106 also optionally performs motion estimation at block boundaries in the DCT domain (step 412) in order to support the MPEG inter/intra mode decision also implemented in the DCT domain, according to Equations (26) and (27) (step 414). Partial video encoder 106 requantizes the DCT coefficient data using an optional rate control algorithm, according to Equation (23) (step 416). Partial video encoder then performs conventional MPEG encoding techniques on the requantized DCT coefficient data in order to generate the output encoded video bitstream conforming to the MPEG standard (step 418).

When the input encoded video bitstream conforms to the MJPEG standard, the processing of transcoding system 100 of FIG. 1 is analogous to the processing in FIG. 4, except that steps 404 and 406 are never needed.

The present invention has been described in the context of MJPEG-to-MPEG and DV-to-MPEG transcoding. Those skilled in the art will appreciate that some of the features of the present invention can be applied to transcoding between bitstreams conforming to different DCT-based image compression algorithms other than only MJPEG or DV as the input bitstream and/or only MPEG as the output bitstream.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for converting an input encoded video bitstream conforming to a first DCT-based compression algorithm into an output encoded video bitstream conforming to a second DCT-based compression algorithm different from the first DCT-based compression algorithm, comprising the steps of:
   (a) applying decoding steps conforming to the first compression algorithm to the input bitstream to generate dequantized DCT coefficient data in a DCT domain;
   (b) performing motion-compensated inter-frame differencing on the dequantized DCT coefficient data in the DCT domain based on motion vectors corresponding to block boundaries without performing an inverse transform; and
   (c) applying encoding steps conforming to the second compression algorithm to the motion-compensated inter-frame DCT coefficient difference data to generate the output bitstream.

2. The method of claim 1, wherein the first compression algorithm is an MJPEG algorithm and the second compression algorithm is an MPEG algorithm.

3. The method of claim 1, wherein the first compression algorithm is a DV algorithm and the second compression algorithm is an MPEG algorithm.

4. The method of claim 1, wherein step (b) comprises the step of performing an inter/intra mode decision based on a variance measure in the DCT domain.

5. The method of claim 1, wherein step (b) comprises the step of applying a subsampling and anti-aliasing filter matrix operation to the dequantized DCT coefficient data in the DCT domain in order to resize image dimensions of the dequantized DCT coefficient data, wherein the filter matrix comprises a filter kernel that appears at a different location within each row of the filter matrix.

6. The method of claim 1, wherein:
   step (b) comprises the step of converting the dequantized DCT coefficient data from a 2–4×8 mode format into an 8×8 mode format in the DCT domain; and
   step (c) comprises the step of applying encoding steps conforming to the second compression algorithm to the converted DCT coefficient data in the 8×8 mode format to generate the output bitstream.

7. The method of claim 1, wherein:
step (b) comprises the step of converting the dequantized DCT coefficient data from a YUV 4:1:1 color format into a YUV 4:2:0 color format in the DCT domain; and
step (c) comprises the step of applying encoding steps conforming to the second compression algorithm to the converted DCT coefficient data in the YUV 4:2:0 color format to generate the output bitstream.

8. The method of claim 1, wherein:
step (b) comprises the step of performing a field/frame mode decision on the dequantized DCT coefficient data in the DCT domain to determine whether to encode the dequantized DCT coefficient data in a field mode or in a frame mode; and
step (c) comprises the step of applying encoding steps conforming to the second compression algorithm to the DCT coefficient data in one of the field mode and the frame mode to generate the output bitstream.

9. The method of claim 1, wherein:
step (b) comprises the steps of:
(1) applying a subsampling and anti-aliasing filter matrix operation to the dequantized DCT coefficient data in the DCT domain in order to resize image dimensions of the dequantized DCT coefficient data, wherein the filter matrix comprises a filter kernel that appears at a different location within each row of the filter matrix;
(2) converting the dequantized DCT coefficient data from a 2–4×8 mode format into an 8×8 mode format in the DCT domain;
(3) converting the dequantized DCT coefficient data from a YUV 4:1:1 color format into a YUV 4:2:0 color format in the DCT domain; and
(4) performing a field/frame mode decision on the dequantized DCT coefficient data in the DCT domain to determine whether to encode the dequantized DCT coefficient data in a field mode or in a frame mode; and
step (c) comprises the steps of:
(1) performing an inter/intra mode decision based on a variance measure in the DCT domain;
(2) applying encoding steps conforming to the second compression algorithm to the converted DCT coefficient data in the 8×8 mode format to generate the output bitstream;
(3) applying encoding steps conforming to the second compression algorithm to the converted DCT coefficient data in the YUV 4:2:0 color format to generate the output bitstream; and
(4) applying encoding steps conforming to the second compression algorithm to the DCT coefficient data in one of the field mode and the frame mode to generate the output bitstream.

10. The method of claim 1, wherein, for each block of DCT coefficient data, the motion-compensated inter-frame differencing is performed using all of the DCT coefficient data in said each block.

11. A computer-readable medium having stored thereon a plurality of instructions, the plurality of instructions including instructions which, when executed by a processor, cause the processor to implement a method for converting an input encoded video bitstream conforming to a first DCT-based compression algorithm into an output encoded video bitstream conforming to a second DCT-based compression algorithm different from the first compression algorithm, the method comprising the steps of:

(a) applying decoding steps conforming to the first compression algorithm to the input bitstream to generate dequantized DCT coefficient data in a DCT domain;
(b) performing motion-compensated inter-frame differencing on the dequantized DCT coefficient data in the DCT domain based on motion vectors corresponding to block boundaries without performing an inverse transform; and
(c) applying encoding steps conforming to the second compression algorithm to the motion-compensated inter-frame DCT coefficient difference data to generate the output bitstream.

12. The medium of claim 11, wherein, for each block of DCT coefficient data, the motion-compensated inter-frame differencing is performed using all of the DCT coefficient data in said each block.

13. A transcoding system for converting an input encoded video bitstream conforming to a first DCT-based compression algorithm into an output encoded video bitstream conforming to a second DCT-based compression algorithm different from the first compression algorithm, comprising:
(a) a partial video decoder configured to apply decoding steps conforming to the first compression algorithm to the input bitstream to generate dequantized DCT coefficient data in a DCT domain; and
(b) a partial video encoder configured to:
(1) perform motion-compensated inter-frame differencing on the dequantized DCT coefficient data in the DGT domain based on motion vectors corresponding to block boundaries without performing an inverse transform; and
(2) apply encoding steps conforming to the second compression algorithm to the motion-compensated inter-frame DCT coefficient difference data to generate the output bitstream.

14. The system of claim 13, wherein the first compression algorithm is an MJPEG algorithm and the second compression algorithm is an MPEG algorithm.

15. The system of claim 13, wherein the first compression algorithm is a DV algorithm and the second compression algorithm is an MPEG algorithm.

16. The system of claim 13, wherein the partial video encoder is configured to perform an inter/intra mode decision based on a variance measure in the DCT domain.

17. The system of claim 13, further comprising a DCT data converter configured to apply a subsampling and anti-aliasing filter matrix operation to the dequantized DCT coefficient data in the DCT domain in order to resize image dimensions of the dequantized DCT coefficient data, wherein the filter matrix comprises a filter kernel that appears at a different location within each row of the filter matrix.

18. The system of claim 13, further comprising a DCT data converter configured to convert the dequantized DCT coefficient data from a 2–4×8 mode format into an 8×8 mode format in the DCT domain, wherein the partial video encoder is configured to apply encoding steps conforming to the second compression algorithm to the converted DCT coefficient data in the 8×8 mode format to generate the output bitstream.

19. The system of claim 13, further comprising a DCT data converter configured to convert the dequantized DCT coefficient data from a YUV 4:1:1 color format into a YUV 4:2:0 color format in the DCT domain, wherein the partial video encoder is configured to apply encoding steps conforming to the second compression algorithm to the converted DCT coefficient data in the YUV 4:2:0 color format to generate the output bitstream.

20. The system of claim 13, wherein the partial video encoder is configured to:

(3) perform a field/frame mode decision on the dequantized DCT coefficient data in the DCT domain to determine whether to encode the dequantized DCT coefficient data in a field mode or in a frame mode; and (4) apply encoding steps conforming to the second compression algorithm to the DCT coefficient data in one of the field mode and the frame mode to generate the output bitstream.

21. The system of claim 13, further comprising a DCT data converter configured to:

(1) apply a subsampling and anti-aliasing filter matrix operation to the dequantized DCT coefficient data in the DCT domain in order to resize image dimensions of the dequantized DCT coefficient data, wherein the filter matrix comprises a filter kernel that appears at a different location within each row of the filter matrix;

(2) convert the dequantized DCT coefficient data from a 2–4×8 mode format into an 8×8 mode format in the DCT domain;

(3) convert the dequantized DCT coefficient data from a YUV 4:1:1 color format into a YUV 4:2:0 color format in the DCT domain; and (4) perform a field/frame mode decision on the dequantized DCT coefficient data in the DCT domain to determine whether to encode the dequantized DCT coefficient data in a field mode or in a frame mode; and wherein the partial video encoder is configured to:

(3) perform an inter/intra mode decision based on a variance measure in the DCT domain;

(4) apply encoding steps conforming to the second compression algorithm to the converted DCT coefficient data in the 8×8 mode format to generate the output bitstream;

(5) apply encoding steps conforming to the second compression algorithm to the converted DCT coefficient data in the YUV 4:2:0 color format to generate the output bitstream; and (6) apply encoding steps conforming to the second compression algorithm to the DCT coefficient data in one of the field mode and the frame mode to generate the output bitstream.

22. The system of claim 13, wherein, for each block of DCT coefficient data, the motion-compensated inter-frame differencing is performed using all of the DCT coefficient data in said each block.

* * * * *